US010767991B2

(12) United States Patent
Ohtomo et al.

(10) Patent No.: US 10,767,991 B2
(45) Date of Patent: Sep. 8, 2020

(54) LASER SCANNER

(71) Applicant: TOPCON Corporation, Tokyo-to (JP)

(72) Inventors: Fumio Ohtomo, Saitama (JP); Kaoru Kumagai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 415 days.

(21) Appl. No.: 15/784,563

(22) Filed: Oct. 16, 2017

(65) Prior Publication Data

US 2018/0106615 A1 Apr. 19, 2018

(30) Foreign Application Priority Data

Oct. 17, 2016 (JP) .................................. 2016-203424

(51) Int. Cl.
| | | |
|---|---|---|
| *G01C 3/08* | (2006.01) | |
| *G01S 17/42* | (2006.01) | |
| *G01S 17/89* | (2020.01) | |
| *G01S 7/481* | (2006.01) | |
| *G01C 15/00* | (2006.01) | |
| *G01S 7/497* | (2006.01) | |
| *G06T 5/50* | (2006.01) | |

(52) U.S. Cl.
CPC ............. *G01C 15/002* (2013.01); *G01C 3/08* (2013.01); *G01S 7/4817* (2013.01); *G01S 7/497* (2013.01); *G01S 17/42* (2013.01); *G01S 17/89* (2013.01); *G06T 5/50* (2013.01)

(58) Field of Classification Search
CPC ........ G01S 17/89; G01S 17/42; G01S 7/4817; G01S 7/497; G06T 5/50; G01C 3/08; G01C 15/002

USPC .......................................................... 356/4.01
See application file for complete search history.

(56) References Cited

U.S. PATENT DOCUMENTS

| | | |
|---|---|---|
| 2016/0238385 A1 | 8/2016 | Ohtomo et al. |
| 2016/0238708 A1 | 8/2016 | Ohtomo et al. |
| 2018/0095166 A1* | 4/2018 | Inoue ..................... G01S 17/89 |
| 2018/0095174 A1* | 4/2018 | Mertz .................. G01B 11/002 |

(Continued)

FOREIGN PATENT DOCUMENTS

| | | |
|---|---|---|
| JP | 2016-151422 A | 8/2016 |
| JP | 2016-151423 A | 8/2016 |

*Primary Examiner* — Daniel L Murphy
(74) *Attorney, Agent, or Firm* — Nields, Lemack & Frame, LLC

(57) ABSTRACT

A laser scanner includes a distance measuring unit which has a light emitting element for emitting a distance measuring light, a distance measuring light projecting unit, a light receiving unit and a photodetector for producing a light receiving signal, and which performs a distance measurement based on the light receiving signal, an optical axis deflecting unit provided on a distance measuring optical axis and for deflecting the distance measuring optical axis, a projecting direction detecting unit for detecting a deflection angle of the distance measuring optical axis and a control component for controlling the optical axis deflecting unit and the distance measuring unit, wherein the optical axis deflecting unit comprises a pair of optical prisms capable of rotating and motors for rotating the optical prisms, and wherein the control component is configured to control the optical axis deflecting unit, scan the distance measuring light and acquire scanning data under scanning conditions corresponding to a measurement range.

18 Claims, 9 Drawing Sheets

(56) References Cited

U.S. PATENT DOCUMENTS

2018/0284235 A1* 10/2018 Ohtomo ................ G01S 7/4817
2019/0011536 A1* 1/2019 Ohtomo ................ G01S 7/4818

* cited by examiner

LASER SCANNER

BACKGROUND OF THE INVENTION

The present invention relates to a laser scanner which acquires point cloud data.

In recent years, in a field of a civil engineering and an architecture, a laser scanner which acquires point cloud data is used as a device which performs a distance measurement and a shape measurement.

In a conventional laser scanner, when a scanning area is set in advance and scanning conditions (for instance, a scanning speed and a light emission frequency) are once set, the scanning area is entirely scanned under the scanning conditions as set.

On the other hand, in a case where an object to be measured has a monotonous shape, a scanning density (the number of measuring point data per unit area) (a point cloud density) may be practically low. Alternatively, in a case where the object to be measured has a complicated shape, a higher point cloud density is better. Therefore, the point cloud density is set under the most demanded scanning conditions. Therefore, even a portion with a monotonous shape (e.g., a wall surface of a building) must be scanned in high density, and an enormous amount of scanning data must be acquired, which is not practical and economical.

SUMMARY OF THE INVENTION

It is an object of the present invention to provide a laser scanner which can change a scanning density corresponding to a measuring portion.

To attain the object as described above, a laser scanner according to the present invention comprises a distance measuring unit which has a light emitting element for emitting a distance measuring light, a distance measuring light projecting unit for projecting the distance measuring light, a light receiving unit for receiving a reflected distance measuring light and a photodetector for receiving the reflected distance measuring light and producing a light receiving signal, and which performs a distance measurement of an object to be measured based on the light receiving signal from the photodetector, an optical axis deflecting unit provided on a distance measuring optical axis and for deflecting the distance measuring optical axis, a projecting direction detecting unit for detecting a deflection angle of the distance measuring optical axis and a control component for controlling a deflecting operation of the optical axis deflecting unit and a distance measuring operation of the distance measuring unit, wherein the optical axis deflecting unit comprises a pair of optical prisms capable of rotating with the distance measuring optical axis as a center and motors which individually and independently rotate the optical prisms, and wherein the control component is configured to control a deflection by the optical axis deflecting unit by controlling rotating directions, rotating speeds, and a rotation ratio of the pair of optical prisms, scan the distance measuring light within a measurement range as set, and acquire scanning data under scanning conditions corresponding to the measurement range.

Further, in the laser scanner according to the present invention, the control component performs an entire scanning of a measurement range by rotating the two optical prisms over a total circumference in a predetermined relationship.

Further, in the laser scanner according to the present invention, a local measurement range is set within the measurement range, the control component individually rotates the two optical prisms in predetermined deflection angle ranges, integrally rotates the two optical prisms at a predetermined angle, and performs a local scanning within the local measurement range.

Further, in the laser scanner according to the present invention, the control component sets a scanning density corresponding to a circumstance of the object to be measured in the local measurement range.

Further, the laser scanner according to the present invention further comprises an image pickup unit with an image pickup optical axis parallel to the distance measuring optical axis which is not deflected by the optical axis deflecting unit and an image processing component, wherein the image processing component performs an edge extraction processing from an image acquired by the image pickup unit, and the control component sets the local measurement range so as to include an extracted edge.

Further, the laser scanner according to the present invention further comprises an image pickup unit with an image pickup optical axis parallel to the distance measuring optical axis which is not deflected by the optical axis deflecting unit, wherein an image acquisition by the image pickup unit is synchronized with a scanning.

Further, in the laser scanner according to the present invention, the scanning density in the local scanning is higher than the scanning density of the entire scanning.

Further, in the laser scanner according to the present invention, the scanning data includes distance data and reflected light amount data, and the control component is configured to prepare a distance image with a display corresponding to a distance based on the distance data or a distance image with a gray-scale display based on the reflected light amount data.

Further, in the laser scanner according to the present invention, the control component is configured to acquire a first image in synchronization with the entire scanning, a second image in synchronization with the local scanning, and combine a result of the entire scanning with a result of the local scanning by an image matching between the first image and the second image.

Further, in the laser scanner according to the present invention, the control component is configured to perform the local scanning to a plurality of the local measurement range within the measurement range, and correct the image acquired by the image pickup unit based on the result of the local scanning as obtained.

Furthermore, in the laser scanner according to the present invention, the local scanning is performed at a measuring pitch which is smaller than a beam diameter of the distance measuring light and at which beam spots are overlapped on each other.

According to the present invention, a laser scanner comprises a distance measuring unit which has a light emitting element for emitting a distance measuring light, a distance measuring light projecting unit for projecting the distance measuring light, a light receiving unit for receiving a reflected distance measuring light and a photodetector for receiving the reflected distance measuring light and producing a light receiving signal, and which performs a distance measurement of an object to be measured based on the light receiving signal from the photodetector, an optical axis deflecting unit provided on a distance measuring optical axis and for deflecting the distance measuring optical axis, a projecting direction detecting unit for detecting a deflection angle of the distance measuring optical axis and a control component for controlling a deflecting operation of the optical axis deflecting unit and a distance measuring operation of the distance measuring unit, wherein the optical axis deflecting unit comprises a pair of optical prisms capable of rotating with the distance measuring optical axis as a center and motors which individually and independently rotate the optical prisms, and wherein the control component is configured to control a deflection by the optical axis deflecting unit by controlling rotating directions, rotating speeds, and a rotation ratio of the pair of optical prisms, scan the distance measuring light within a measurement range as set, and acquire scanning data under scanning conditions corresponding to the measurement range. As a result, the scanning data can be efficiently acquired without performing an unnecessary scanning.

DETAILED DESCRIPTION OF THE PREFERRED EMBODIMENT

A description will be given below on an embodiment of the present invention by referring to the attached drawings.

First, a description will be given on general features of a surveying system which comprises a laser scanner according to the present embodiment in FIG. 1.

Figure 1:
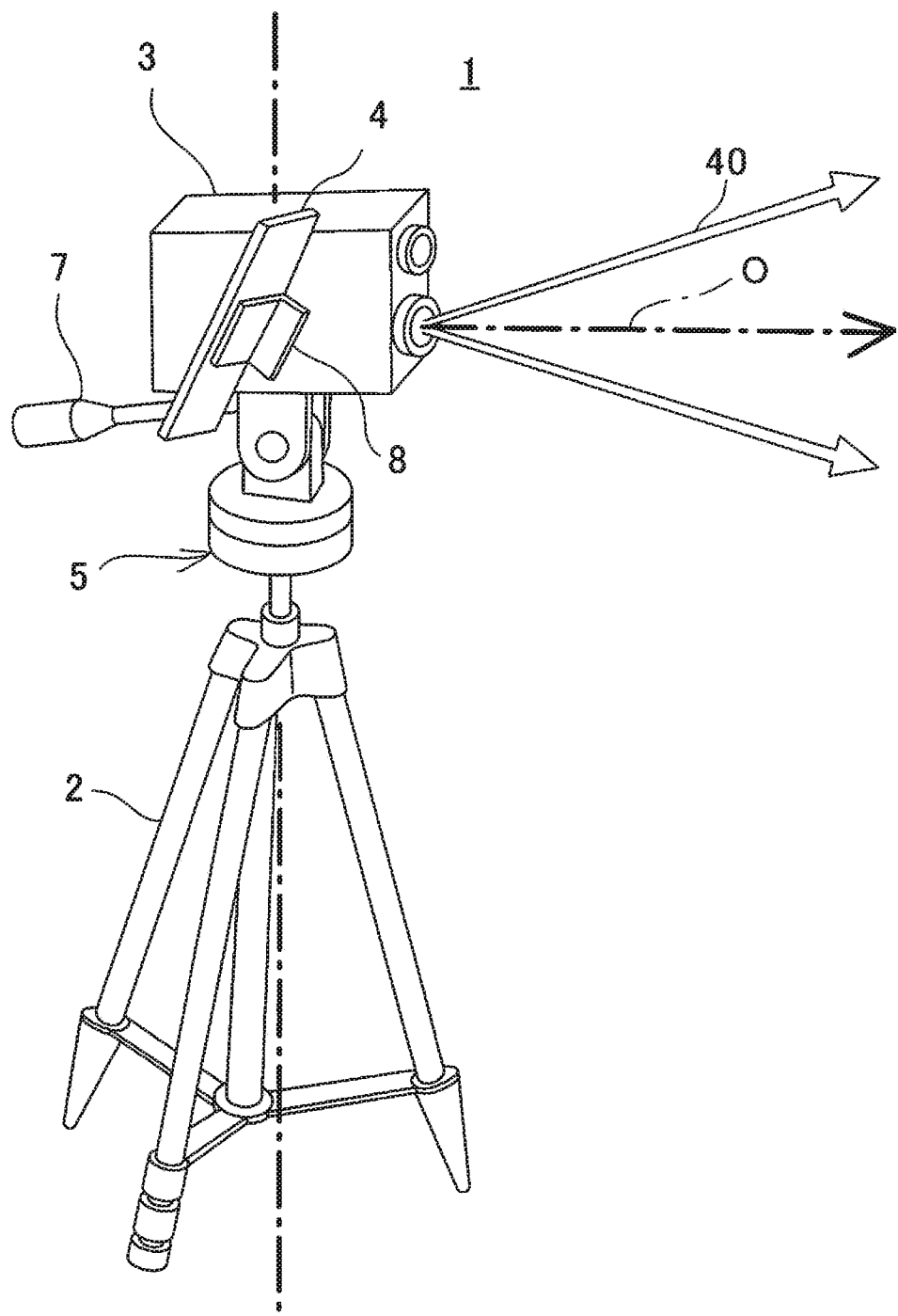
FIG. 1 is an external view of a survey system which comprises a laser scanner according to an embodiment of the present invention.

In FIG. 1, a reference numeral 1 denotes a surveying system, a reference sign O denotes a distance measuring optical axis in a state where an optical axis is not deflected, and the distance measuring optical axis at this moment is determined as a reference optical axis.

The surveying system 1 is mainly constituted of a tripod 2 as a supporting unit, a laser scanner 3, an operation device 4, and a rotation base 5. The rotation base 5 is mounted on an upper end of the tripod 2, and the laser scanner 3 is mounted on the rotation base 5 so as to be capable of rotating in a lateral direction and rotating in a longitudinal direction. Further, the rotation base 5 includes a function for detecting a rotation angle of the laser scanner 3 in the lateral direction (a rotation angle in a horizontal direction).

A lever 7 extending in the lateral direction is provided to the rotation base 5. By operating the lever 7, the laser scanner 3 can be rotated in an up and down direction (a vertical direction) or in the lateral direction (the horizontal direction) and can be also fixed in an attitude as required.

The laser scanner 3 has a built-in distance measuring unit (to be described later) and a built-in attitude detecting unit (to be described later). The distance measuring unit projects a distance measuring light toward an object to be measured or a measurement range, receives a reflected distance measuring light and performs a distance measurement. Further, the attitude detecting unit can detect an attitude of the laser scanner 3 with respect to the vertical (or the horizontal) with high accuracy.

The operation device 4 has a communicating function to perform a communication to and from the laser scanner 3 via a manner as required such as wired manner or a non-wired manner. Further, the operation device 4 can be attached to and detached from the laser scanner 3 via an attachment 8, and the operation device 4 as detached can be held in one hand and operated. Further, the laser scanner 3 can be remotely controlled by the operation device 4.

Further, an image, a measuring state, a measurement result, or the like are transmitted from the laser scanner 3 to the operation device 4, and the image, the measuring state, the measurement result, or the like are stored in the operation device 4 or displayed on a display unit (not shown). The operation device 4 may be a smartphone, for instance.

Figure 2:
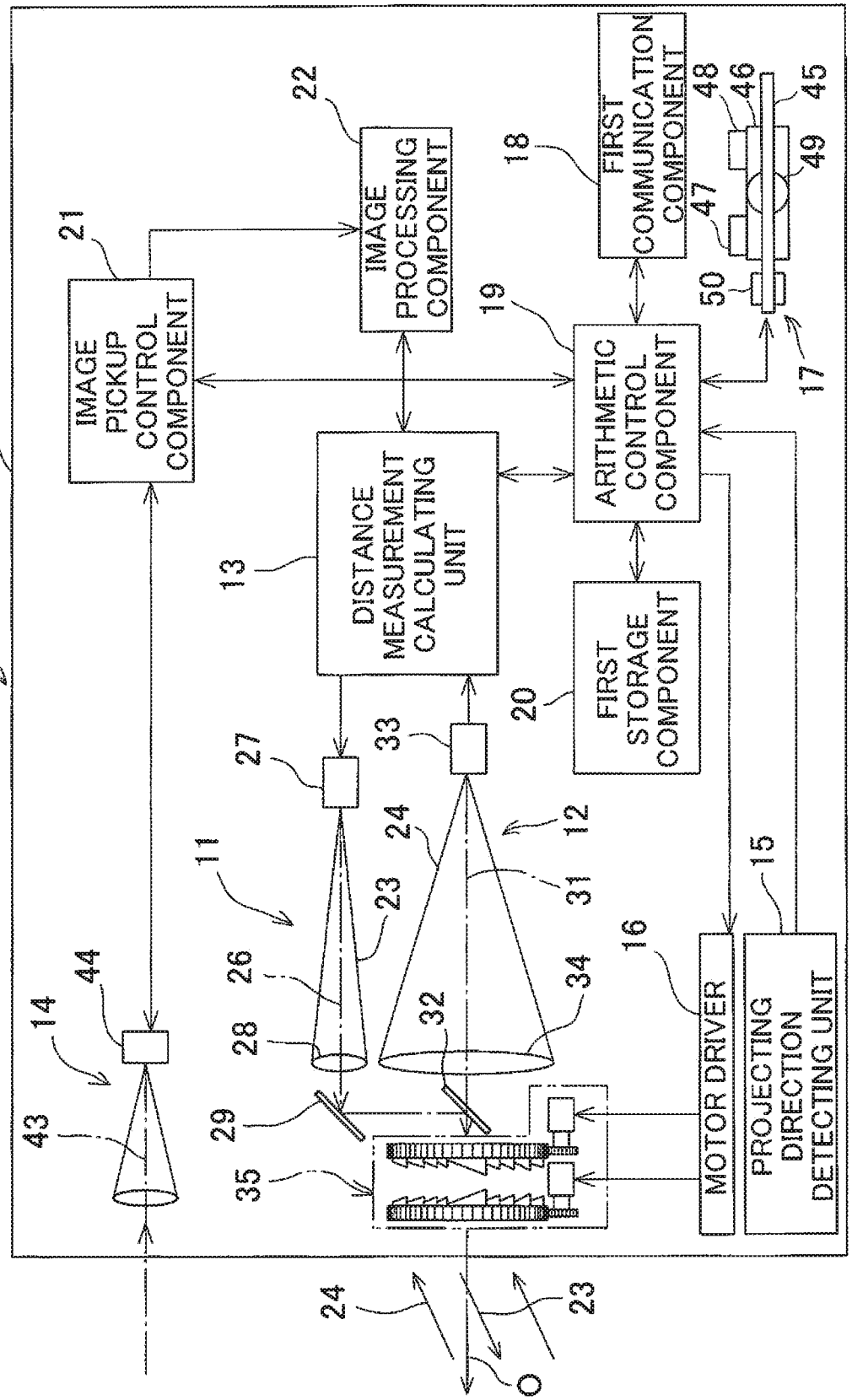
FIG. 2 is a schematical block diagram of the laser scanner.

A description will be given on the laser scanner 3 by referring to FIG. 2.

The laser scanner 3 includes a distance measuring light projecting unit 11, a light receiving unit 12, a distance measurement calculating unit 13, an image pickup unit 14, a projecting direction detecting unit 15, a motor driver 16, an attitude detecting unit 17, a first communication component 18, an arithmetic control component 19, a first storage component 20, an image pickup control component 21, and an image processing component 22, and these components are accommodated in a casing 9 and integrated. It is to be noted that the distance measuring light projecting unit 11, the light receiving unit 12, the distance measurement calculating unit 13, or the like constitute a distance measuring unit.

The distance measuring light projecting unit 11 has a projection optical axis 26, and a light emitting element 27, e.g. a laser diode (lD), is disposed on the projection optical axis 26. Further, a projecting lens 28 is disposed on the projection optical axis 26. Further, the projection optical axis 26 is deflected by a first reflection mirror 29 as a deflecting optical component disposed on the projection optical axis 26 and a second reflection mirror 32 as a deflecting optical component disposed on a light receiving optical axis 31 (to be described later) so as to coincide with the light receiving optical axis 31. The first reflection mirror 29 and the second reflection mirror 32 constitute a projection optical axis deflecting unit.

The light emitting element 27 emits a pulsed laser beam, and the distance measuring light projecting unit 11 projects the pulsed laser beam emitted from the light emitting element 27 as a distance measuring light 23.

A description will be given on the light receiving unit 12. A reflected distance measuring light 24 from an object to be measured (i.e., a measuring point) enters the light receiving unit 12. The light receiving unit 12 has the light receiving optical axis 31, and the projection optical axis 26 deflected by the first reflection mirror 29 and the second reflection mirror 32 coincides with the light receiving optical axis 31 as described above. It is to be noted that a state where the projection optical axis 26 coincides with the light receiving optical axis 31 is determined as a distance measuring optical axis 40 (see FIG. 1).

An optical axis deflecting unit 35 (to be described later) is disposed on the projection optical axis 26 as deflected, i.e., on the light receiving optical axis 31. A straight optical axis passing through a center of the optical axis deflecting unit 35 is the reference optical axis O. The reference optical axis O coincides with the projection optical axis 26 or the light receiving optical axis 31 which is not deflected by the optical axis deflecting unit 35.

An image forming lens 34 is disposed on the light receiving optical axis 31 which passes through the optical axis deflecting unit 35 and enters, and a photodetector 33, e.g., a photodiode (PD) is also provided. The image forming lens 34 focuses the reflected distance measuring light 24 on the photodetector 33. The photodetector 33 receives the reflected distance measuring light 24 and produces a light receiving signal. The light receiving signal is input to the distance measurement calculating unit 13. The distance measurement calculating unit 13 determines a distance to the measuring point based on the light receiving signal.

Figure 3:
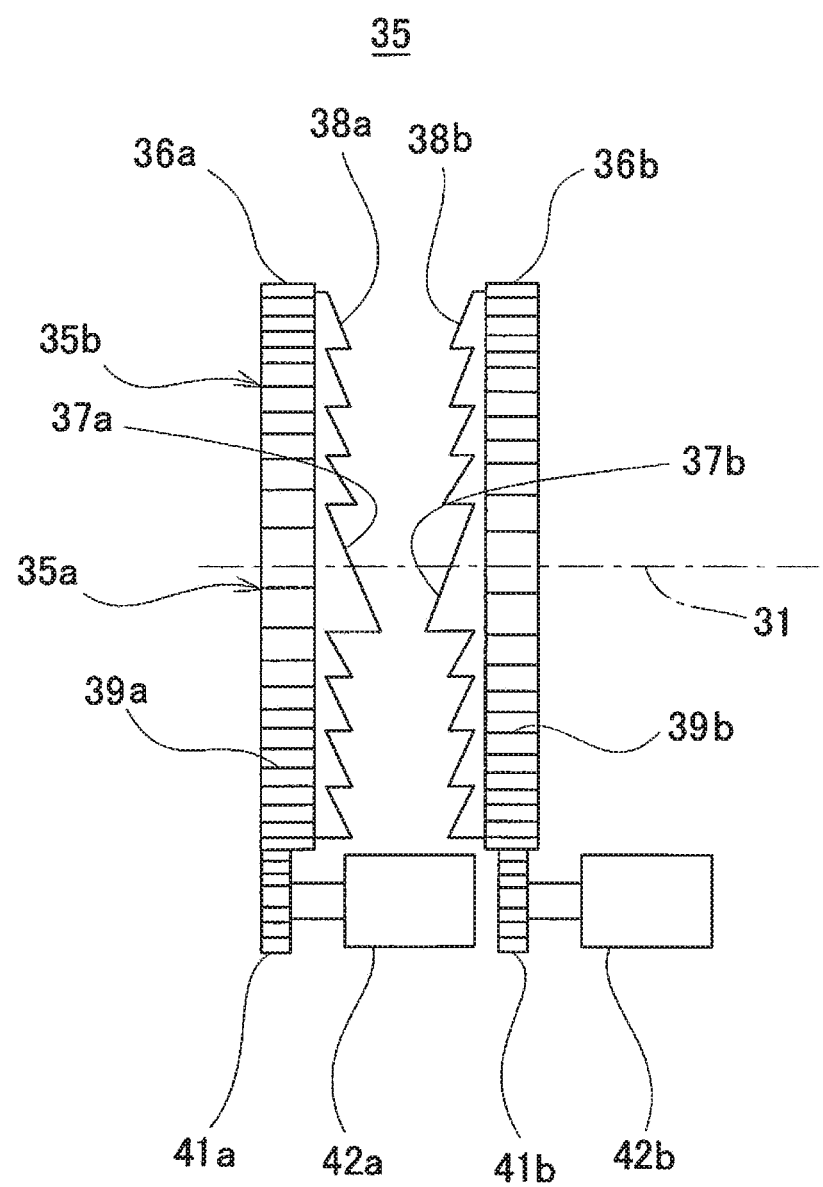
FIG. 3 is a schematical drawing of an optical axis deflecting unit in the laser scanner.

A description will be given on the optical axis deflecting unit 35 by referring to FIG. 3.

The optical axis deflecting unit 35 is constituted of a pair of optical prisms 36a and 36b. The optical prisms 36a and 36b are designed in a disk-like shape respectively, disposed perpendicularly on the light receiving optical axis 31, overlapped on each other and arranged in parallel to each other. As for the optical prisms 36a and 36b, a Fresnel prism is preferably used in order to reduce a size of the instrument.

A central part of the optical axis deflecting unit 35 is designed as a distance measuring light deflecting unit 35a which is a first optical axis deflecting unit which the distance measuring light 23 passes through and is projected from. A portion except the central part of the optical axis deflecting unit 35 is designed as a reflected distance measuring light deflecting unit 35b which is a second optical axis deflecting unit which the reflected distance measuring light 24 passes through and enters.

The Fresnel prisms used as the optical prisms 36a and 36b are constituted of prism elements 37a and 37b and a large number of prism elements 38a and 38b which are formed in parallel to each other respectively, and have a disk-like shape. The optical prisms 36a and 36b, each of the prism elements 37a and 37b and the prism elements 38a and 38b have the same optical characteristics, respectively.

The prism elements 37a and 37b make up the distance measuring light deflecting unit 35a, and the prism elements 38a and 38b make up the reflected distance measuring light deflecting unit 35b.

The Fresnel prism may be manufactured from an optical glass or the Fresnel prism may be molded by using an optical plastic material. By molding the Fresnel prism by using the optical plastic material, a low cost Fresnel prism can be manufactured.

The optical prisms 36a and 36b are arranged in such a manner that the optical prisms 36a and 36b can independently and individually rotate with the light receiving optical axis 31 as the center, respectively. By independently controlling rotating directions, rotation amounts and rotating speeds, the optical prisms 36a and 36b deflect the projection optical axis 26 of the distance measuring light 23 as emitted in an arbitrary direction, and deflect the light receiving optical axis 31 of the reflected distance measuring light 24 as received in parallel to the projection optical axis 26.

An outer shape of each of the optical prisms 36a and 36b is designed in a circle shape with the light receiving optical axis 31 as the center. Taking an expansion of the reflected distance measuring light 24 into consideration, diameters of the optical prisms 36a and 36b are set so that a sufficient light amount can be obtained.

A ring gear 39a is fitted with an outer periphery of the optical prism 36a, and a ring gear 39b is fitted with an outer periphery of the optical prism 36b.

A driving gear 41a meshes with the ring gear 39a, and the driving gear 41a is fixed to an output shaft of a motor 42a. Similarly, a driving gear 41b meshes with the ring gear 39b, and the driving gear 41b is fixed to an output shaft of a motor 42b. The motors 42a and 42b are electrically connected to the motor driver 16.

As the motors 42a and 42b, a motor which can detect a rotation angle or a motor which rotates corresponding to a driving input value, e.g., a pulse motor is used. Alternatively, by using a rotation angle detector which detects a rotation amount (the rotation angle) of the motor, e.g., an encoder or the like, the rotation amount of the motor may be detected. The rotation amounts of the motors 42a and 42b are detected respectively, and the motors 42a and 42b are individually controlled by the motor driver 16. It is to be noted that encoders may be directly attached to the ring gears 39a and 39b respectively so that the rotation angles of the ring gears 39a and 39b are directly detected by the encoders.

The driving gears 41a and 41b and the motors 42a and 42b are provided at positions not interfering with the distance measuring light projecting unit 11, for instance, on a lower side of the ring gears 39a and 39b.

The projecting lens 28, the first reflection mirror 29, the second reflection mirror 32, the distance measuring light deflecting unit 35a or the like make up a light projecting optical system, and the reflected distance measuring light deflecting unit 35b, the image forming lens 34 or the like make up a light receiving optical system.

The distance measurement calculating unit 13 controls the light emitting element 27, and makes the light emitting element 27 emit a pulsed laser beam as the distance measuring light 23. The projection optical axis 26 is deflected by the prism elements 37a and 37b (the distance measuring light deflecting unit 35a) so that the distance measuring light 23 is directed toward a measuring point.

The reflected distance measuring light 24 as reflected from the object to be measured enters through the optical prisms 38a and 38b (the reflected distance measuring light deflecting unit 35b) and the image forming lens 34, and is received by the photodetector 33. The photodetector 33 sends a light receiving signal to the distance measurement calculating unit 13, the distance measurement calculating unit 13 performs a distance measurement at the measuring point (a point irradiated with the distance measuring light) per each pulsed light based on the light receiving signal from the photodetector 33, and distance measurement data is stored in the first storage component 20. Thus, by performing the distance measurement per each pulsed light while scanning the distance measuring light 23, distance measurement data of each measuring point can be acquired.

The projecting direction detecting unit 15 counts driving pulses input to the motors 42a and 42b and detects rotation angles of the motors 42a and 42b. Alternatively, the projecting direction detecting unit 15 detects the rotation angles of the motors 42a and 42b based on a signal from an encoder. Further, the projecting direction detecting unit 15 calculates rotational positions of the optical prisms 36a and 36b based on the rotation angles of the motors 42a and 42b. Further, the projecting direction detecting unit 15 calculates a deflection angle and a projecting direction of the distance measuring light based on refractive indexes and the rotational positions of the optical prisms 36a and 36b, and calculation results are input to the arithmetic control component 19.

When the arithmetic control component 19 calculates a horizontal angle and a vertical angle of the measuring point based on the deflection angle and the projecting direction of the distance measuring light and associates the horizontal angle and the vertical angle with respect to each measuring point with the distance measurement data, the arithmetic control component 19 can acquire three-dimensional data of the measuring point.

A description will be given on the attitude detecting unit 17. It is to be noted that, as the attitude detecting unit 17, an attitude detecting unit disclosed in Japanese Patent Laid-open Publication No. 2016-151423 can be used.

The attitude detecting unit 17 has a frame 45, and the frame 45 is fixed to the casing 9 or fixed to a structural member and integrated with the laser scanner 3.

A sensor block 46 is attached on the frame 45 via a gimbal. The sensor block 46 can freely rotate 360° around two axes which are orthogonal to each other.

A first tilt sensor 47 and a second tilt sensor 48 are attached on the sensor block 46.

The first tilt sensor 47 is for detecting the horizontal with high accuracy, for instance, a tilt detector which allows a detection light to enter a horizontal liquid surface and detects the horizontal from a change in a reflection angle of a reflection light, or a bubble tube which detects a tilt based on a positional change of a sealed air bubble. Further, the second tilt sensor 48 is for detecting a change in a tilt with high responsiveness, e.g., an acceleration sensor.

Relative rotation angles of the two axes of the sensor block 46 with respect to the frame 45 are detected by encoders 49 and 50.

Further, a motor (not shown) which rotates the sensor block 46 and maintains the sensor block 46 horizontally is provided with respect to the two axes, and the motor is controlled by the arithmetic control component 19 so as to maintain the sensor block 46 horizontally based on detection results from the first tilt sensor 47 and the second tilt sensor 48.

In a case where the sensor block 46 tilts (in a case where the laser scanner 3 tilts), the relative rotation angles with respect to the sensor block 46 are detected by the encoders 49 and 50, and a tilt angle and a tilting direction of the laser scanner 3 are detected based on detection results of the encoders 49 and 50.

Since the sensor block 46 can freely rotate 360° around the two axes, the attitude detecting unit 17 enables to perform an attitude detection in all directions no matter what attitude the attitude detecting unit 17 takes (for instance, even when the attitude detecting unit 17 is upside down).

In the attitude detection, in a case where a high responsiveness is required, although the attitude detection and an attitude control are performed based on the detection result of the second tilt sensor 48, the second tilt sensor 48 has poorer detection accuracy than the first tilt sensor 47 in general.

In the attitude detecting unit 17, by comprising the first tilt sensor 47 with high accuracy and the second tilt sensor 48 with high responsiveness, the attitude control is Performed based on the detection results of the second tilt sensor 48, and the attitude detection with high accuracy can be performed by the first tilt sensor 47.

The detection result of the second tilt sensor 48 can be calibrated based on the detection result of the first tilt sensor 47. That is, if a deviation occurs between values of the encoders 49 and 50 when the first tilt sensor 47 detects the horizontal, that is, between an actual tilt angle and the tilt angle as detected by the second tilt sensor 48, the tilt angle of the second tilt sensor 48 can be calibrated based on the deviation.

Therefore, by obtaining a relationship between the detected tilt angle of the second tilt sensor 48 and the tilt angle which is obtained based on the horizontal detection by the first tilt sensor 47 and the detection results of the encoders 49 and 50 in advance, the tilt angle detected by the second tilt sensor 48 can be calibrated. Therefore, an accuracy of the attitude detection with high responsiveness by the second tilt sensor 48 can be improved.

When a fluctuation in a tilt is large and/or when a change in a tilt is rapid, the arithmetic control component 19 controls the motors based on a signal from the second tilt sensor 48. Further, when a fluctuation in the tilt is small and/or a change in the tilt is slow, that is, in a state where the first tilt sensor 47 is capable of following up, the arithmetic control component 19 controls the motors based on a signal from the first tilt sensor 47.

It is to be noted that the first storage component 20 stores comparison data which shows a comparison result of the detection result of the first tilt sensor 47 and the detection result of the second tilt sensor 48. The arithmetic control component 19 calibrates the detection result obtained by the second tilt sensor 48 based on the signal from the second tilt sensor 48. This calibration enables to improve the detection result obtained by the second tilt sensor 48 to a detection accuracy of the first tilt sensor 47. Thus, in the attitude detection by the attitude detecting unit 17, the high responsiveness can be realized while maintaining the high accuracy.

The image pickup unit 14 is a camera which has an image pickup optical axis 43 parallel to the reference optical axis O of the laser scanner 3 and has a field angle of, e.g., 50°, and acquires image data including a scanning range of the laser scanner 3. A relationship between the image pickup optical axis 43 and the projection optical axis 26 and a relationship between the image pickup optical axis 43 and the reference optical axis O are known. Further, the image pickup unit 14 can acquire video images or continuous images.

The image pickup control component 21 controls an image pickup of the image pickup unit 14. In a case where the image pickup unit 14 picks up the video images or the continuous images, the image pickup control component 21 synchronizes a timing of acquiring a frame image constituting the video images or the continuous images with a timing of performing a scanning by the laser scanner 3. The arithmetic control component 19 also carries out associating the images with point cloud data.

An image pickup element 44 of the image pickup unit 14 is a CCD or a CMOS sensor which is an aggregate of pixels, and it is so arranged that a position of each pixel on an image element can be specified. For instance, each pixel has pixel coordinates in a coordinate system with the image pickup optical axis 43 as an origin point, and the position of each pixel on the image element can be specified by the pixel coordinates.

The image processing component 22 performs image processings such as an edge extraction processing, a feature point extraction, an image tracking processing, an image matching, and the like to the image data acquired by the image pickup unit 14, and prepares a gray-scale image from image data.

A description will be given on a measuring operation of the laser scanner 3.

The tripod 2 is installed at a known point (a known point of three-dimensional coordinates) or a predetermined point, and the reference optical axis O is directed toward the object to be measured. A horizontal angle of the reference optical axis O at this moment, is detected by a horizontal angle detecting function of the rotation base 5, and a tilt angle of the reference optical axis O with respect to the horizontal is detected by the attitude detecting unit 17.

A description will be given on a deflecting function and a scanning function of the optical axis deflecting unit 35 by referring to FIG. 4A, FIG. 4B, and FIG. 4C.

Figure 4A:
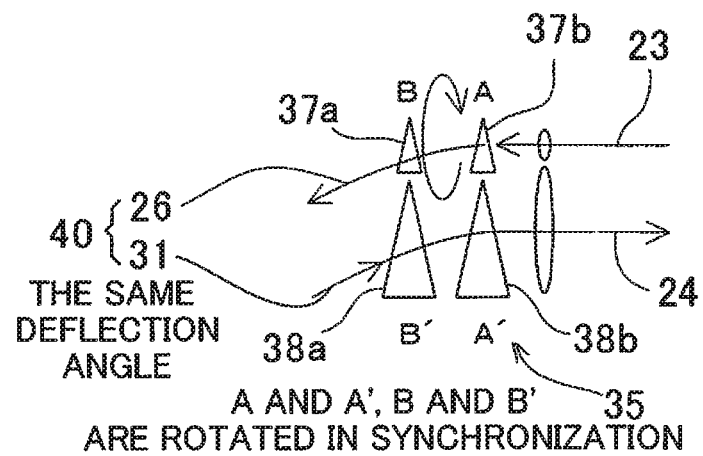
FIG. 4A, FIG. 4B, and FIG. 4C are drawings to explain an operation of the optical axis deflecting unit.

It is to be noted that, in order to simplify an explanation, in FIG. 4A, the optical prisms 36a and 36b are shown by separating the prism elements 37a and 37b and the prism elements 38a and 38b. Further, FIG. 4A shows a state where the prism elements 37a and 37b and the prism elements 38a and 38b are positioned in the same direction, and a maximum deflection angle can be obtained in this state. Further, a minimum deflection angle is obtained at a position where either one of the optical prisms 36a and 36b rotates 180°, mutual optical actions of the optical prisms 36a and 36b are offset, and the deflection angle becomes 0°. Therefore, an optical axis of a laser beam (the distance measuring optical axis 40) as projected and received through the optical prisms 36a and 36b coincides with the reference optical axis O.

The distance measuring light 23 is emitted from the light emitting element 27, and the distance measuring light 23 is turned to a parallel luminous flux by the projecting lens 28 and projected toward the object to be measured or the measurement range through the distance measuring light deflecting unit 35a (the prism elements 37a and 37b). Here, by passing through the distance measuring light deflecting unit 35a, the distance measuring light is deflected in a direction as required by the prism elements 37a and 37b and is projected.

The reflected distance measuring light 24 as reflected by the object to be measured or the measurement range is entered through the reflected distance measuring light deflecting unit 35b, and is focused on the photodetector 33 by the image forming lens 34.

When the reflected distance measuring light passes through the reflected distance measuring light deflecting unit 35b, an optical axis of the reflected distance measuring light is deflected by the prism elements 38a and 38b so as to coincide with the light receiving optical axis 31 (FIG. 4A).

By combining the rotational position of the optical prism 36a with the rotational position of the optical prism 36b, a deflecting direction and a deflection angle of the distance measuring light to be projected can be arbitrarily changed.

Further, in a state where a positional relationship between the optical prism 36a and the optical prism 36b is fixed (in a state where a deflection angle obtained by the optical prism 36a and the optical prism 36b is fixed), the optical prism 36a and the optical prism 36b are integrally rotated by the motors 42a and 42b. A locus drawn by the distance measuring light passing through the distance measuring light deflecting unit 35a becomes a circle with the distance measuring optical axis 40 as the center.

Therefore, when the optical axis deflecting unit 35 is rotated while emitting the laser beam from the light emitting element 27, the distance measuring light 23 can be scanned by a circular locus. It is to be noted that it is needless to say that the reflected distance measuring light deflecting unit 35b rotates integrally with the distance measuring light deflecting unit 35a.

Figure 4B:
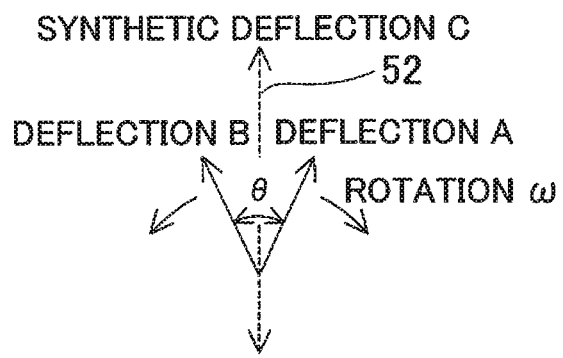

Next, FIG. 4B shows a case where the optical prism 36a and the optical prism 36b are relatively rotated. Assuming that a deflecting direction of an optical axis as deflected by the optical prism 36a is a deflection "A" and a deflecting direction of an optical axis as deflected by the optical prism 36b is a deflection "B", the deflection of the optical axes by the optical prisms 36a and 36b becomes a synthetic deflection "C" as an angle difference θ between the optical prisms 36a and 36b.

Therefore, in a case where the optical prism 36a and the optical prism 36b are synchronized in an opposite direction and reciprocally rotated at a constant speed, the distance measuring light passed through the optical prisms 36a and 36b is scanned linearly. Therefore, when the optical prisms 36a and 36b are reciprocally rotated in the opposite direction at the constant speed, as shown in FIG. 4B, the distance measuring light can be reciprocally scanned in a direction of the synthetic deflection C by a linear locus 52.

Figure 4C:
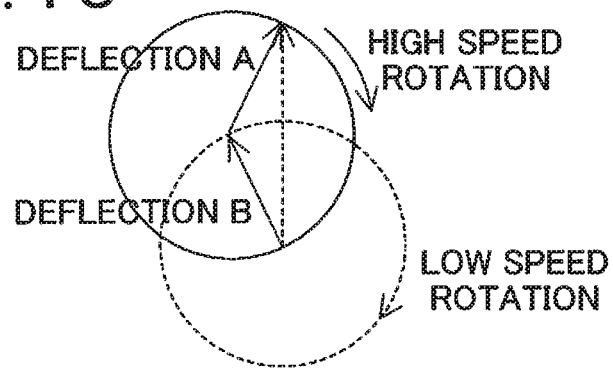

Further, as shown in FIG. 4C, when the optical prism 36b is rotated at a rotating speed lower than a rotating speed of the optical prism 36a, since the distance measuring tight is rotated while the angle difference θ gradually increases, a scanning locus of the distance measuring light becomes a spiral form.

Furthermore, by individually controlling the rotating directions and the rotating speeds of the optical prism 36a and the optical prism 36b, various scanning patterns, e.g., a pattern where the scanning locus of the distance measuring light is made in an irradiation direction (scanning in a radial direction) with the reference optical axis O as the center, or in the horizontal direction, or in the vertical direction, or the like can be obtained.

Figure 5:
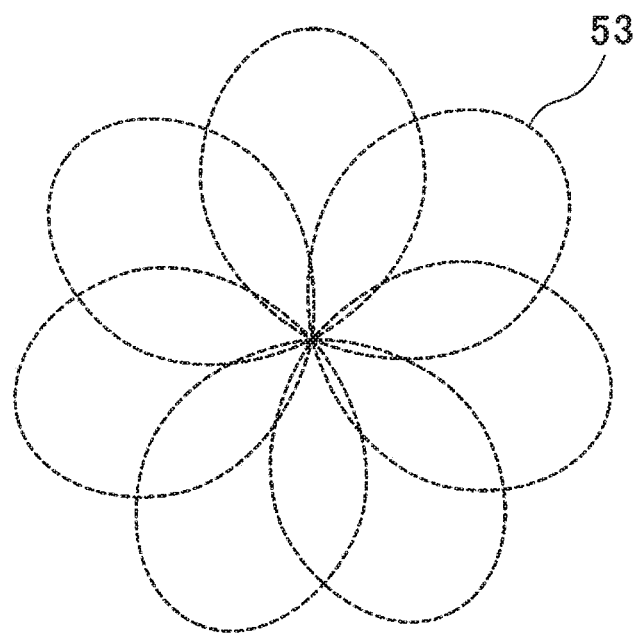
FIG. 5 is a drawing to show an example of a scanning pattern carried out by the laser scanner.

FIG. 5 shows an example of the scanning patterns. A scanning pattern 53 shown in FIG. 5 is a petal-shaped scanning pattern (hereinafter referred as a petal pattern).

The scanning pattern 53 is obtained by rotating one optical prism 36a for 25 times and rotating the other optical prism 36b in a reverse direction for five times, for instance. In case of the scanning pattern 53, the 25 rotations/5 reverse rotations form is one pattern cycle. Further, by carrying out the measurement in a scanning process, scanning data can be acquired along a scanning locus of the scanning pattern 53. It is to be noted that a rotation ratio of the optical prisms 36a and 36b and each rotating direction of the optical prisms 36a and 36b are adequately selected according to a scanning pattern to be obtained.

Here, the photodetector 33 receives the reflected distance measuring light, and the distance measurement calculating unit 13 calculates a distance based on a light receiving signal emitted by the photodetector 33. Further, since the photodetector 33 emits the light receiving signal corresponding to a light amount of the reflected distance measuring light, the scanning data includes distance measurement data and reflected light amount data.

Further, in a case where a density of the scanning data is increased, by integrally rotating the optical prisms 36a and 36b at a predetermined angle per each pattern cycle and the similarly scanning by the scanning pattern 53, a pattern provided by rotating the scanning pattern 53 at a predetermined angle step is obtained, the pattern becomes a scanning pattern with increased density.

Next, as a mode of the measurement performed by the laser scanner 3, by performing a distance measurement by fixing the optical axis deflecting unit 35 (the optical prisms 36a and 36b) at per each deflection angle as required, the distance measurement with respect to a specific measuring point can be performed. Further, a directional angle (a horizontal angle and a vertical angle) at a time of the distance measurement can be obtained based on a detection result of the projecting direction detecting unit 15. Further, a tilt and a tilting direction of the laser scanner 3 with respect to the horizontal can be detected by the attitude detecting unit 17, and a measurement result can be corrected to data with a horizontal standard based on a detection result of the attitude detecting unit 17. That is, the laser scanner 3 can be used in a similar way to a total station.

Further, by carrying out the distance measurement while continuously changing a deflection angle of the optical axis deflecting unit 35, i.e., by carrying out the distance measurement while scanning the distance measuring light, the distance measurement data (the scanning data) can be acquired along the scanning locus.

Further, regarding the scanning conditions determined by a scanning speed, the scanning density, and the like, the scanning speed can increase or decrease by maintaining a relationship between the motors 42a and 42b and increasing or decreasing the rotating speed, and the scanning density can be set to a value as desired by controlling a relationship between the scanning speed and a pulse emission cycle of the distance measuring light.

Further, a projecting directional angle of the distance measuring light at the time of the distance measurement can be detected based on the rotation angles of the motors 42a and 42b, and by associating the projecting directional angle at the time of the distance measurement with the distance measurement data, three-dimensional distance measurement data can be acquired.

Therefore, the laser scanner 3 can be functioned as a laser scanner which acquires point cloud data with three-dimensional position data.

Although the scanning pattern 53 shown in FIG. 5 is a pattern by which the optical prisms 36a and 36b is rotated over a total circumference and an entire measurement range is scanned, it is also possible to set a local measurement range and set a pattern by which a scanning is performed locally and minutely.

Figure 6A:
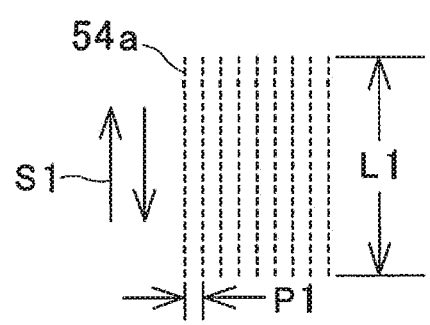
FIG. 6A is a drawing to show an example of a pattern of a local scanning carried out by the laser scanner.
Figure 6B:
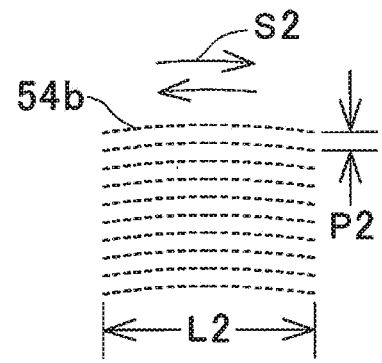
FIG. 6B is a drawing to show another example of the pattern of the local scanning.

FIG. 6A and FIG. 6B show an example of the scanning pattern by which the scanning (a local scanning) is locally performed.

A scanning pattern 54a shown in FIG. 6A is obtained by integrally rotating the optical prisms 36a and 36b by a predetermined angle step p1 per each linear scanning shown in FIG. 4B. It is to be noted that, in FIG. 6A, a reference sign S1 denotes a scanning direction.

Further, a length L1 of the linear scanning can be set by selecting a fluctuation range of the angle difference θ shown in FIG. 4B. A speed of the linear scanning can be arbitrarily set by controlling the rotating speeds of the motors 12a and 42b. Further, the angle step p1 can be arbitrarily set by selecting a feed angle at the time of integrally rotating the optical prisms 36a and 36b.

A scanning pattern 54b shown in FIG. 6B can be obtained by integrally rotating the optical prisms 36a and 36b at a predetermined angle, performing an arc scanning in a circumferential direction, and changing the deflection angle in a radial direction by a predetermined feed step p2 per each arc scanning after a deflection angle of the distance measuring optical axis 40 is set by the optical prisms 36a and 36b. It is to be noted that, in FIG. 6B, a reference sign S2 denotes a scanning direction.

Further, a length L2 of the arc scanning is arbitrarily determined by setting a rotation angle at which the optical prisms 36a and 36b are integrally rotated. A speed of the arc scanning is also arbitrarily set by controlling the rotating speeds of the motors 42a and 42b. Further, a step of the deflection angle is also arbitrarily set by selecting a relative angle between the optical prisms 36a and 36b.

It is to be noted that, regarding the pattern of the local scanning, it is needless to say that various patterns can be set by individually controlling the rotations of the optical prisms 36a and 36b.

A description will be given below on a measurement by the laser scanner 3 by referring to FIG. 1 and FIG. 7 to FIG. 11

The laser scanner 3 is installed at a known point or a predetermined point via the tripod 2.

The reference optical axis C) is directed toward the object to be measured, and a measurement range is set (Step 01).

It is to be noted that the measurement range may be set from an image acquired by the image pickup unit 14. Alternatively, if the measurement range is determined in advance, the reference optical axis O is directed toward a center of the measurement range as determined.

Figure 8:
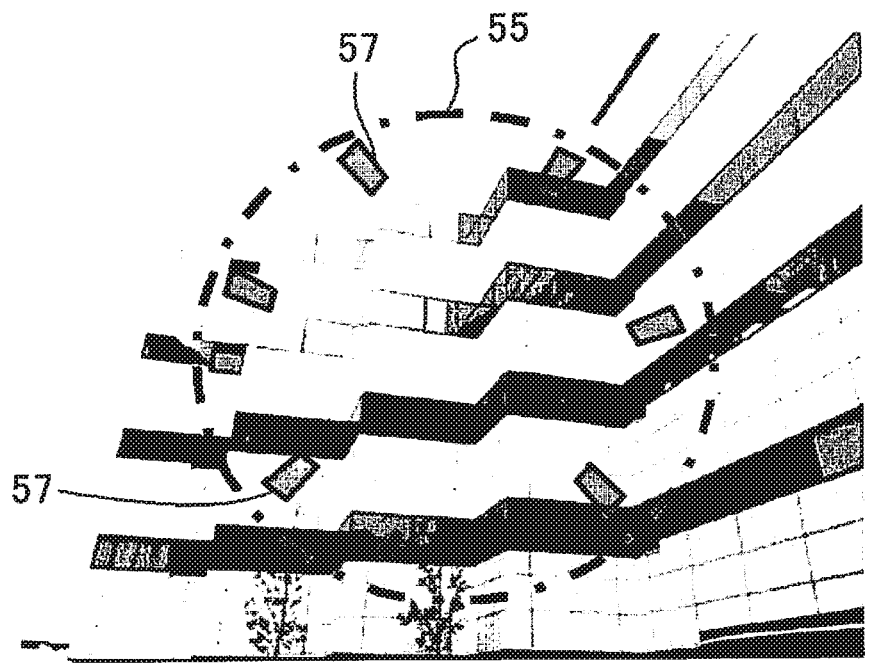
FIG. 8 is an explanatory drawing in a case where the local scanning is performed by the laser scanner.

As shown in FIG. 8, the distance measuring optical axis 40 is deflected at a maximum deflection angle by the optical axis deflecting unit 35 at first, and by scanning the distance measuring light 23 one round (an execution of the circular scanning) at the maximum deflection angle, a circular locus 55, which shows the measurement range capable of measuring, is obtained. Therefore, a final measurement range may be set based on the circular locus 55. It is to be noted that a field angle of the image pickup unit 14 has a size including the measurement range shown by the circular locus 55.

Next, an entire scanning pattern is selected. For instance, the petal pattern (the scanning pattern 53) shown in FIG. 5 is selected, and a scanning is started according to the scanning pattern 53 (Step 02).

Figure 7:
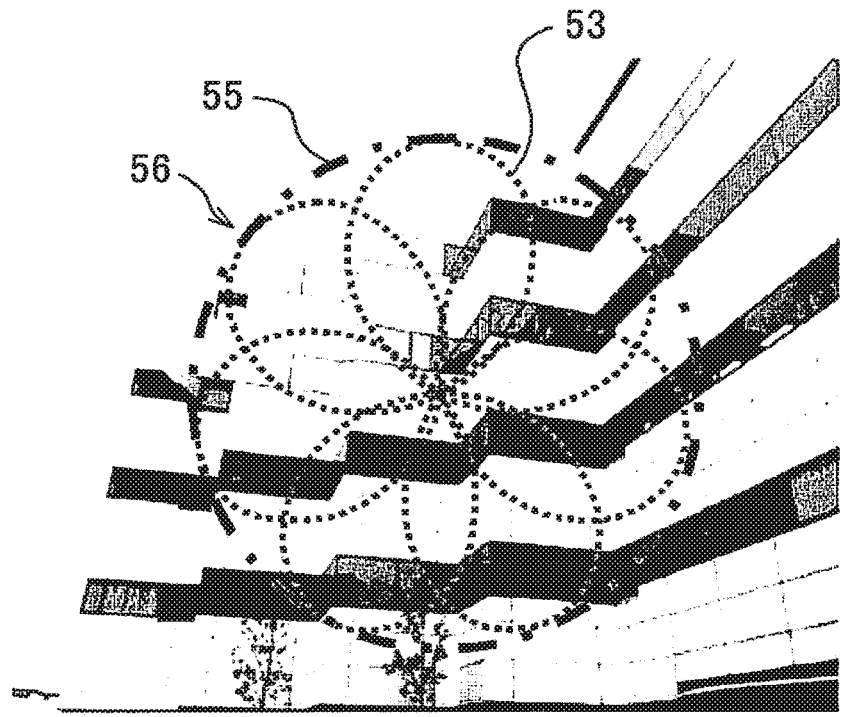
FIG. 7 is an explanatory drawing of an entire scanning in a case where an entire measurement range is scanned by the laser scanner.

The entire measurement range is scanned by the scanning pattern 53 (an entire scanning 56), and the scanning data is acquired (see FIG. 7). Further, if the scanning data of the entire measurement range is required more minutely, the scanning is carried out while rotating the scanning pattern 53 by the predetermined angle step every time one cycle of the scanning pattern 53 is carried out. When a step feeding reaches the predetermined angle, more minute scanning data of the entire measurement range can be acquired (Step 03).

As described above, the scanning data includes the distance data and the reflected light amount data. The arithmetic control component 19 prepares a distance image based on the distance data. Here, the distance image is an image which is displayed corresponding to a distance, for instance, an image as color-coded corresponding to the distance, an image including contour lines or a representation similar to the contour lines, or the like. Further, the arithmetic control component 19 can prepare a gray-scale image based on the reflected light amount.

Further, an image is acquired by the image pickup unit 14 in synchronization with an execution of the entire scanning 56. By synchronizing the execution of the entire scanning 56 with an acquisition of the image, an association of the scanning data with the image becomes easy (Step 04).

It is to be noted that, regarding the synchronization of the execution of the entire scanning 56 and the acquisition of the image, a start of the entire scanning 56 does not necessarily need to coincide with the acquisition of the image, and it would suffice if a measurement timing of the measuring point in a middle of the scanning and an acquisition timing of the image are clarified.

In a case where the object to be measured is a building, the object to be measured is usually constituted of plane surfaces. Therefore, in a case where scanning data of a plane surface such as a wall surface, or the like is acquired, the plane surface can be measured with fewer measuring points (a low point cloud density).

On the other hand, a crossing portion (a ridge line portion) of a plane surface and a plane surface must be measured with high point cloud density. With respect to a portion in which the high point cloud density is required such as the crossing portion, or the like, a local measurement range is set, and the local scanning 57 shown in FIG. 6A and FIG. 6B is carried cut (see FIG. 8) (Step 05).

The scanning pattern which is carried out in the local scanning 57 is adequately selected depending on a circumstance of a measuring portion. For instance, in a case where a ridge line portion extending vertically is scanned locally, the scanning pattern 54b in which the scanning direction crosses a ridge line is selected, or the like.

The arithmetic control component 19 prepares a local distance image and a local gray-scale image from the scanning data obtained by the local scanning 57.

At the time of carrying out the local scanning 57, it may be so arranged that the image is acquired by the image pickup unit 14 in synchronization with the local scanning 57, an image matching between scanning data of the local scanning, an image at the time of the local scanning and an image at the time of the entire scanning performed, and a matching between local scanning data and entire scanning data and a matching between the local scanning data and the image at the time of the entire scanning are carried out based on the matching of the images.

Further, the operator may visually judge whether the local scanning is to be carried out and regarding a selection of a portion to be locally scanned from the image acquired by the entire scanning. Further, conditions for the local scanning may be set by a judgment of the operator. It is to be note that, regarding the ridge line or the like extending in the vertical direction, in a case where the ridge line is assumed to be vertical, it would suffice if upper and lower parts of the ridge line are locally scanned.

Alternatively, a portion and a range to be locally scanned and the scanning conditions may be automatically determined based on a result of an image processing.

An edge processing is carried out on the image, a feature point is extracted, and a predetermined range around the feature point as the center is set as a local scanning range. Alternatively, an edge extraction is performed, and a range of the local scanning is set so that a portion where many edges have been extracted is included. A scanning pattern is selected based on a state of the edges as extracted, the scanning density is set, and the local scanning is performed (Step 06).

It is to be noted that, regarding the scanning density, since a scanning speed and a scanning pitch can be freely set by a control of the rotating speeds of the motors 42a and 42b, the scanning density as desired can be obtained.

Figure 9:
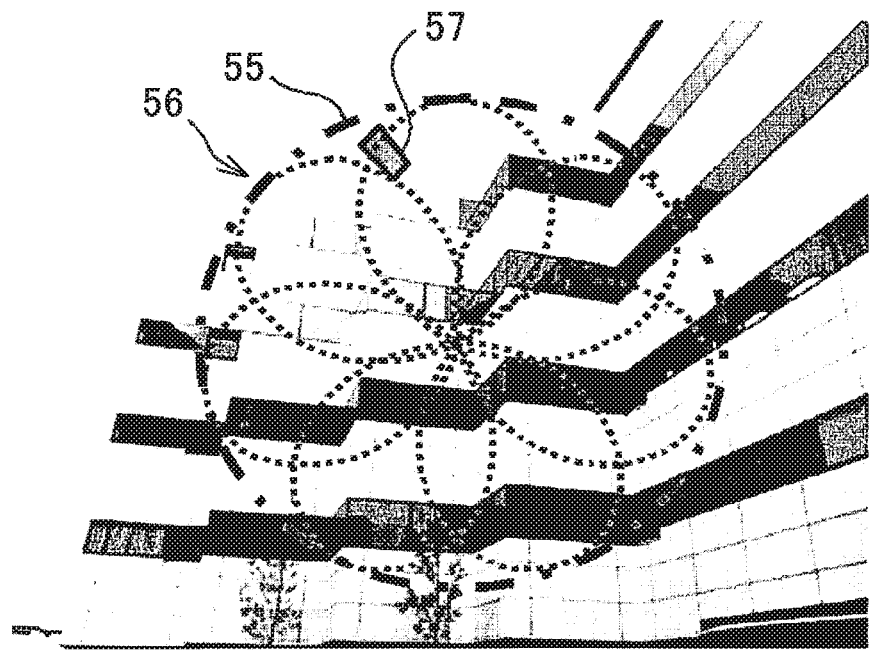
FIG. 9 is an explanatory drawing of a state where a result of performing the entire scanning and a result of performing the local scanning by the laser scanner are superimposed.

When the scanning data obtained by the entire scanning and the local scanning are superimposed on the image, a result is as shown in FIG. 9. It is to be noted that although the local scanning 57 is set at one spot in FIG. 9, it is needless to say that the local scanning 57 is set at a plurality of spots corresponding to portions where the minute scanning data is required.

It is to be noted that a portion or a range of the local scanning may be set in advance before the entire scanning is carried out. In this case, the local scanning may be incorporated into a process of performing the entire scanning.

By combining the entire scanning 56 and the local scanning 57, an unnecessary scanning can be omitted, the minute scanning data can be acquired only with respect to necessary portions. As a result, a work efficiency can be improved, and a practical measurement can be carried out (Step 07).

Next, an image distortion can be corrected based on the local scanning data.

The image acquired by the image pickup unit 14 contains a distortion due to characteristics of the lens.

Figure 10:
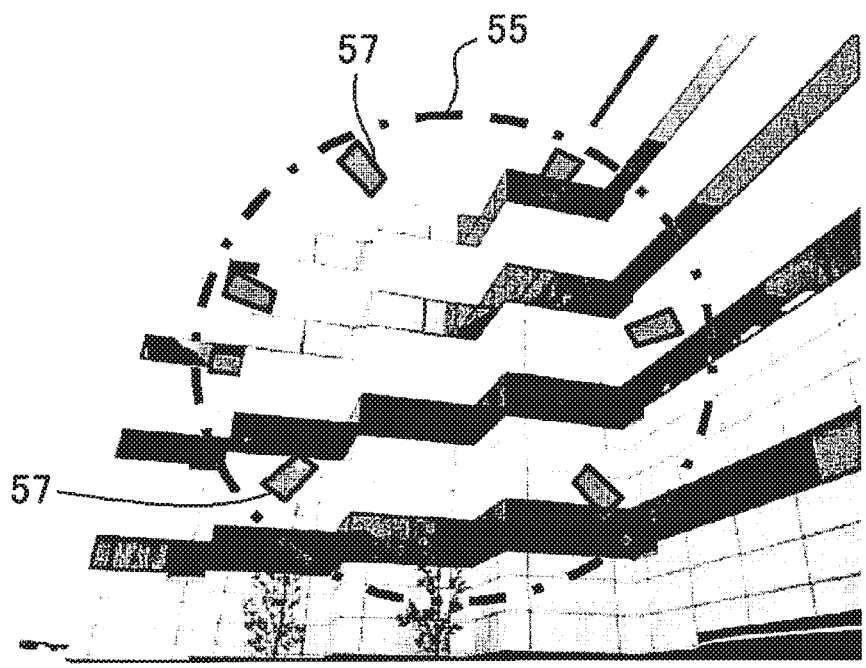
FIG. 10 is an explanatory drawing in a case where an image is corrected by using the local scanning.
Figure 11:
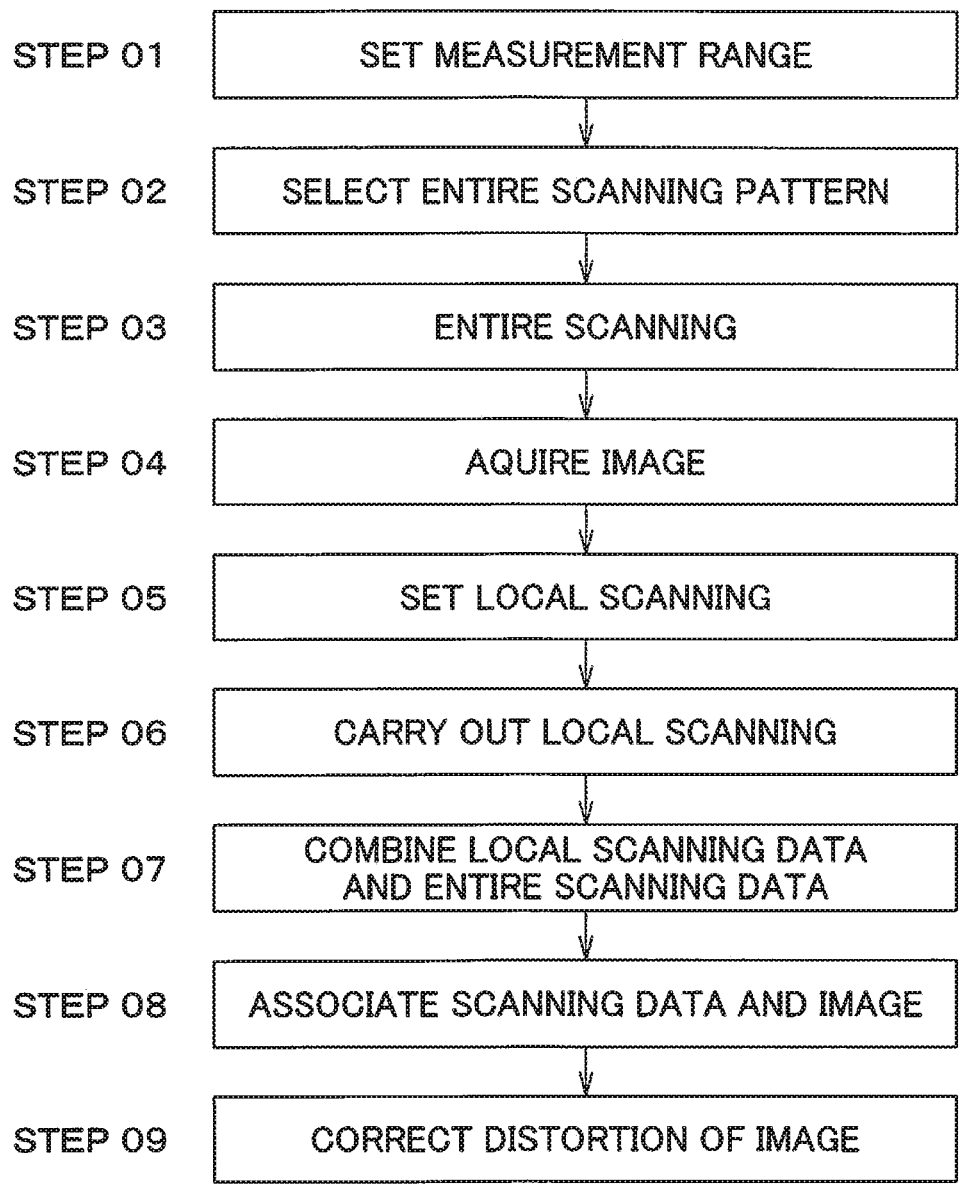
FIG. 11 is a flowchart on a measurement operation of the present embodiment.

As shown in FIG. 10, the local scanning 57 is carried out at a plurality of spots. Preferably, the local scanning 57 is carried out with respect to a periphery of the image where the distortion of the image is apt to appear, e.g., a plurality of spots along the circular locus 55.

Further, a comparison processing is performed between the local scanning data and a corresponding local portion of the entire image (Step 08). The comparison processing may be performed between the local scanning data and the entire image where the edge extraction processing is performed.

Since the local scanning data includes the distance data and angle data associated with the distance data, the distortion of the image can be corrected based on the distance data and the angle data (Step 09).

As described above, in the present embodiment, a scanning state such as a scanning speed, a scanning pattern, or the like can be arbitrarily set by a driving control of the motors 42a and 42b. Therefore, it is possible to change a speed and change a scanning pattern during an execution of the scanning.

Figure 12:
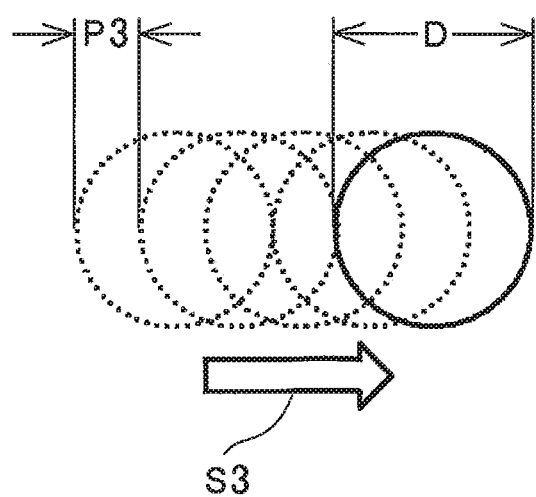
FIG. 12 is an explanatory drawing in a case where a resolution is improved by the local scanning.

FIG. 12 shows a scanning mode for acquiring further minute measurement data.

In FIG. 12, a reference sign D denotes a beam diameter at an irradiating position of the distance measuring light 23, a reference sign p3 denotes a measuring pitch (a pitch between the measuring points), and a reference sign S3 denotes a scanning direction.

At the time of performing the local scanning, a scanning speed and an emission timing are controlled by the arithmetic control component 19 so that the measuring pitch p3 becomes smaller than the beam diameter D.

The measurement pitch p3 is made smaller than the beam diameter D, the scanning is performed, the distance measurement is performed per each distance measuring light, a distance measurement result is acquired per each distance measuring light, and then a resolution corresponding to the measuring pitch p3 can be obtained. Further, the distance measurement data is acquired and simultaneously, a light amount at each measuring point is detected based on the light receiving signal from the photodetector 33.

Therefore, the distance measurement data and the light amount data can be acquired with a resolution which is smaller than a size of the beam diameter.

In the embodiment as described above, although a description has been given on a case where the laser scanner 3 is provided on the tripod 2, since the laser scanner 3 has high accuracy and high responsiveness and further a tilt of the laser scanner 3 in all attitudes can be detected, a monopod (not shown) may be used as a supporting unit, and the laser scanner 3 may be provided at an upper end of the monopod. Because of a support of the monopod, even if the measurement is carried out in a state where the laser scanner 3 tilts, since the attitude detecting unit 17 can detect an attitude of the laser scanner 3 at the time of the measurement in real time, a measurement result of the laser scanner 3 can be corrected based on a detection result of the attitude detecting unit 17.

Similarly, even if the laser scanner 3 is held in a hand and the measurement is performed in a held state, a measurement result can be corrected based on the detection result of the attitude detecting unit 17. As a result, the measurement with high accuracy can be performed.

The invention claimed is:

1. A laser scanner comprising: a distance measuring unit which has a light emitting element for emitting a distance measuring light, a distance measuring light projecting unit for projecting said distance measuring light, a light receiving unit for receiving a reflected distance measuring light and a photodetector for receiving said reflected distance measuring light and producing alight receiving signal, and which performs a distance measurement of an object to be measured based on said light receiving signal from said photodetector,
    an optical axis deflecting unit provided on a distance measuring optical axis and for deflecting said distance measuring optical axis, a projecting direction detecting unit for detecting a deflection angle of said distance measuring optical axis, and
    a control component for controlling a deflecting operation of said optical axis deflecting unit and a distance measuring operation of said distance measuring unit,
    wherein said optical axis deflecting unit comprises a pair of optical prisms capable of rotating with said distance measuring optical axis as a center and motors which individually and independently rotate said optical prisms,
    and wherein said control component is configured to control a deflection by said optical axis deflecting unit by controlling rotating directions, rotating speeds, and a rotation ratio of said pair of optical prisms, scan said distance measuring light within a measurement range as set, and acquire scanning data under scanning conditions corresponding to said measurement range, and
    wherein a local measurement range is set within the measurement range, said control component individually rotates said two optical prisms in predetermined deflection angle ranges, integrally rotates said two optical prisms at a predetermined angle, and performs a local scanning within said local measurement range.

2. The laser scanner according to claim 1, wherein said control component performs an entire scanning of a measurement range by rotating said two optical prisms over a total circumference in a predetermined relationship.

3. The laser scanner according to claim 1, wherein said control component sets a scanning density corresponding to a circumstance of the object to be measured in said local measurement range.

4. The laser scanner according to claim 3, wherein the scanning density in said local scanning is higher than the scanning density of said entire scanning.

5. The laser scanner according to claim 4, wherein said local scanning is performed at a measuring pitch which is smaller than a beam diameter of said distance measuring light and at which beam spots are overlapped on each other.

6. The laser scanner according to claim 3, wherein said local scanning is performed at a measuring pitch which is smaller than a beam diameter of said distance measuring light and at which beam spots are overlapped on each other.

7. The laser scanner according to claim 1, further comprising an image pickup unit with an image pickup optical axis parallel to said distance measuring optical axis which is not deflected by said optical axis deflecting unit and an image processing component, wherein said image processing component performs an edge extraction processing from an image acquired by said image pickup unit, and said control component sets said local measurement range so as to include an extracted edge.

8. The laser scanning according to claim 7, wherein said control component is configured to perform said local scanning to a plurality of said local measurement range within said measurement range, and correct the image acquired by said image pickup unit based on the result of said local scanning as obtained.

9. The laser scanner according to claim 8, wherein said local scanning is performed at a measuring pitch which is smaller than a beam diameter of said distance measuring light and at which beam spots are overlapped on each other.

10. The laser scanner according to claim 7, wherein the scanning density in said local scanning is higher than the scanning density of said entire scanning.

11. The laser scanner according to claim 10, wherein said local scanning is performed at a measuring pitch which is smaller than a beam diameter of said distance measuring light and at which beam spots are overlapped on each other.

12. The laser scanner according to claim 7, wherein said local scanning is performed at a measuring pitch which is smaller than a beam diameter of said distance measuring light and at which beam spots are overlapped on each other.

13. The laser scanner according to claim 1, wherein the scanning density in said local scanning is higher than the scanning density of said entire scanning.

14. The laser scanner according to claim 13, wherein said local scanning is performed at a measuring pitch which is smaller than a beam diameter of said distance measuring light and at which beam spots are overlapped on each other.

15. The laser scanner according to claim 1, wherein said local scanning is performed at a measuring pitch which is smaller than a beam diameter of said distance measuring light and at which beam spots are overlapped on each other.

16. The laser scanner according to claim 1, further comprising an image pickup unit with an image pickup optical axis parallel to said distance measuring optical axis which is not deflected by said optical axis deflecting unit, wherein an image acquisition by said image pickup unit is synchronized with a scanning.

17. The laser scanner according to claim 16, wherein said control component is configured to acquire a first image in synchronization with said entire scanning, a second image in synchronization with said local scanning, and combine a result of said entire scanning with a result of said local scanning by an image matching between said first image and said second image.

18. The laser scanner according to claim 1, wherein said scanning data includes distance data and reflected light amount data, and said control component is configured to prepare a distance image with a display corresponding to a distance based on said distance data or a distance image with a gray-scale display based on said reflected light amount data.

* * * * *